(12) United States Patent
Bussmann

(10) Patent No.: US 11,638,398 B2
(45) Date of Patent: May 2, 2023

(54) COMBINE HARVESTER AND DRIVER ASSISTANCE SYSTEM THEREFOR

(71) Applicant: CLAAS Selbstfahrende Erntemaschinen GmbH, Harsewinkel (DE)

(72) Inventor: Jens Bussmann, Ostercappeln (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 395 days.

(21) Appl. No.: 17/015,304

(22) Filed: Sep. 9, 2020

(65) Prior Publication Data
US 2021/0084816 A1    Mar. 25, 2021

(30) Foreign Application Priority Data

Sep. 24, 2019   (DE) ..................... 10 2019 125 645.3

(51) Int. Cl.
*A01D 41/127* (2006.01)
*A01F 12/18* (2006.01)
(Continued)

(52) U.S. Cl.
CPC .......... *A01D 41/127* (2013.01); *A01F 12/18* (2013.01); *A01D 75/282* (2013.01); *A01F 12/448* (2013.01);
(Continued)

(58) Field of Classification Search
CPC ................ A01D 41/127; A01D 75/282; A01D 41/1273; A01F 12/18; A01F 12/448; A01F 12/52; A01F 2012/188; A01F 12/58
See application file for complete search history.

(56) References Cited

U.S. PATENT DOCUMENTS 6,494,782 B1 * 12/2002 Strong ................. A01F 12/442
460/71
6,932,697 B2   8/2005 Baumgarten et al.
(Continued)

FOREIGN PATENT DOCUMENTS

DE        4406140 A1    8/1995
DE       10307705 A1    9/2004
(Continued)

OTHER PUBLICATIONS

European Search Report dated Dec. 21, 2020 issued in European Application No. 20 18 6666 (with English translation of the relevant parts).

*Primary Examiner* — Arpad F Kovacs
(74) *Attorney, Agent, or Firm* — Collard & Roe, P.C.

(57) ABSTRACT

A driver assistance system for a combine harvester that has a processing stage with an input for a crop flow, a first output for a useful flow and has abundant threshed grains, and a second output for a residual flow with scarce grains. At least one operating parameter of the processing stage is adjustable. The driver assistance system has an actuatable rethreshing device arranged at the second output of the processing stage, a residual grain sensor for detecting a proportion of threshed out grain in the residual flow downstream of the rethreshing device, and an evaluating device that turns the rethreshing device on and off, compares the proportions of threshed out grains in the residual flow when the rethreshing device is turned on and when the rethreshing device is turned off, and to adapt the at least one operating parameter of the processing stage based on the comparison.

14 Claims, 3 Drawing Sheets

(51) Int. Cl.
*A01D 75/28* (2006.01)
*A01F 12/44* (2006.01)
*A01F 12/52* (2006.01)

(52) U.S. Cl.
CPC ......... *A01F 12/52* (2013.01); *A01F 2012/188* (2013.01)

(56) References Cited

U.S. PATENT DOCUMENTS

| | | | |
|---|---|---|---|
| 7,415,365 B2 | 8/2008 | Jeppe | |
| 9,155,249 B2* | 10/2015 | Baumgarten | ........... A01F 12/28 |
| 9,756,787 B2 | 9/2017 | Heitmann et al. | |
| 10,674,671 B2 | 6/2020 | Ricketts et al. | |
| 2004/0226275 A1* | 11/2004 | Baumgarten | ......... A01F 12/448 |
| | | | 56/153 |
| 2005/0096108 A1* | 5/2005 | Van Quekelberghe | ...................... A01F 7/067 |
| | | | 460/66 |
| 2014/0215984 A1* | 8/2014 | Bischoff | .............. A01D 41/127 |
| | | | 56/10.2 R |
| 2016/0000008 A1* | 1/2016 | Schøler | .............. A01D 41/1272 |
| | | | 56/10.2 R |
| 2016/0081271 A1 | 3/2016 | Mott et al. | |
| 2018/0084718 A1* | 3/2018 | Baumgarten | ...... A01D 41/1243 |
| 2019/0069470 A1* | 3/2019 | Pfeiffer | ................ A01B 79/005 |
| 2021/0029877 A1* | 2/2021 | Vandike | ............. G01C 21/3848 |

FOREIGN PATENT DOCUMENTS

| | | | | |
|---|---|---|---|---|
| DE | 102006015152 A1 | | 9/2008 | |
| DE | 102013201996 A1 | * | 8/2014 | ........... A01B 79/005 |
| EP | 3076248 A1 | | 10/2016 | |
| EP | 3494774 A1 | | 6/2019 | |

* cited by examiner

COMBINE HARVESTER AND DRIVER ASSISTANCE SYSTEM THEREFOR

CROSS-REFERENCE TO RELATED APPLICATIONS

This application claims priority under 35 USC 119 of German Application No. DE 10 2019 125 645.3, filed on Sep. 24, 2019, the disclosure of which is herein incorporated by reference.

BACKGROUND OF THE INVENTION

The present invention is directed to a driver assistance system for optimizing the operating efficiency of a combine harvester and to a combine harvester which uses a driver assistance system of this kind.

A combine harvester conventionally comprises a processing stage for processing collected crop, particularly for threshing and separating a crop flow into a useful flow with abundant threshed out grains and a residual flow with sparse grains.

Operating parameters of the processing stage such as the speeds of moving components or clearance widths between components influence important variables such as fuel consumption, purity and broken grain proportion of the useful flow and grain proportion in the residual flow in a manner which is difficult to estimate for operating efficiency. Therefore, it is not possible for a driver of the combine harvester to optimize the operating parameters in economic respects without technical equipment.

However, the use of technical equipment when optimizing the operating parameters can ultimately only lead to satisfactory results when the measurement data needed for this purpose can be measured.

It is known from DE 10 2006 015 152 A1 to arrange a grain sensor in an ejection passage of a combine harvester via which the residual flow is discharged onto the field. The grain sensor makes it possible to draw conclusions about the quantity of grains in the residual flow from the intensity of a noise produced by the grains of the residual flow when impacting on a surface and, on this basis, to optimize the threshing and separating process. The residual grain sensor only responds to threshed out grains. Threshing losses, i.e., unsuccessfully threshed grains and grains to which the ears or fragments thereof are still attached when reaching the sensor, are not detected. Determining the threshing losses from the windrowed field is time-consuming. Moreover, this determination is of limited utility because the operating conditions of the combine harvester may have changed to such an extent in the time required to determine the threshing losses that a change in the operating parameters decided upon in view of the threshing losses may possibly already be obsolete by the time it is available and the threshing results are not improved. Further, while reduced threshing losses can easily be achieved in theory by a more intensive threshing, it may be economically disadvantageous owing to the increased energy consumption entailed and the proportion of broken grain.

SUMMARY OF THE INVENTION

Therefore, in order to operate a combine harvester efficiently, a driver assistance system capable of obtaining data about the threshing losses in real time and taking into account the control of a processing stage of the combine harvester would be desirable.

This goal is met according to the invention by a driver assistance system for a combine harvester in which a processing stage of the combine harvester has an input for a crop flow, a first output for a useful flow obtained from the crop flow with abundant threshed grains, and a second output for a residual flow with scarce grains, wherein at least one operating parameter of the processing stage is adjustable, wherein the driver assistance system comprises: an actuatable rethreshing device to be arranged at the second output of the processing stage, a residual grain sensor for detecting a proportion of threshed out grain in the residual flow downstream of the rethreshing device, and an evaluating device which is adapted to turn the rethreshing device on and off, to compare the proportions of threshed out grains in the residual flow when the rethreshing device is turned on and when the rethreshing device is turned off, and to adapt the at least one operating parameter of the processing stage based on the comparison.

Due to the fact that the actuatable threshing device is placed as a rethreshing device at the second output of the processing stage, the question of whether or not the rethreshing device is turned on has no influence on the processing taking place upstream of the second output. This makes it easier to find an appropriate setting of the at least one operating parameter based on the data of the grain sensor. The disadvantages of intensive threshing, increased energy consumption and higher proportion of broken grain occur only in those operating phases of the combine harvester in which the rethreshing device is actually in operation. The percentage of the total operating time of the combine harvester represented by these operating phases can be selected to be as small as required so that the measurement averaged over the total operating time has only a minimal impact on the energy consumption of the combine harvester and the proportion of broken grain.

High threshing losses are indicated when the percentage of threshed grains in the residual flow measured when the rethreshing device is turned on is very different from the percentage of threshed grains in the residual flow measured when the rethreshing device is turned off. Therefore, the evaluating device is preferably adapted to change the at least one operating parameter when the difference exceeds a threshold.

The actuatable rethreshing device can be formed by at least one radially adjustable segment of a separating grate. The action of the rethreshing device can be modulated in that the width of a gap through which the residual flow passes is changed by means of the radial adjustment.

The radial adjustment can be carried out robustly and economically by swiveling the adjustable segment around an axis.

The axis preferably extends adjacent to an edge of the adjustable segment. In particular, the adjustable segment extends in circumferential direction of a separating rotor over a portion of the circumference thereof, and the axis extends adjacent to a front edge of the adjustable segment in relation to the rotating direction of the separating rotor. Accordingly, when the rethreshing device is turned on by swiveling the adjustable segment inward, a gap which continuously narrows in rotational direction of the separating rotor is formed between the adjustable segment and the separating rotor, and the threshing action is uniformly distributed over the entire extent of the segment.

The processing stage typically comprises a threshing stage and a separating stage. The at least one operating parameter mentioned above can be an operating parameter of the threshing stage or of the separating stage.

An input of the separating stage and the second output should be located at opposite ends of the separating stage.

With reference to a conveying direction of the crop from the input to the second output, the separating stage can have an upstream portion in which the first output is located and a downstream portion in which the rethreshing device is located. The rethreshing device then serves exclusively to increase the proportion of isolated grains that can be detected in the residual flow by the grain sensor, and all of the grains additionally threshed by the rethreshing device pass through the second output and are detectable by means of the grain sensor, which facilitates the evaluation of the sensor signal and the conversion of the sensor signal into a grain quantity.

According to a preferred alternative, the first output is elongated with reference to a conveying direction of the crop from the input to the second output, and a portion of the separating stage in which the rethreshing device is located overlaps in the conveying direction with a downstream end of the first output. Accordingly, grains which are additionally threshed by the rethreshing device can be fed to the useful flow.

Beyond this, further rethreshing devices can be provided at the second output which are not actuatable but are in continuous operation when used during harvesting. The expenditure of energy for their operation is justified because at least a portion of the grain threshed by these rethreshing devices arrives in the useful flow via the overlapping first output and can accordingly improve yields.

The further rethreshing devices can be formed by segments of the separating grate adjacent to the radially adjustable segment in circumferential direction.

With reference to the conveying direction, the separating rotor can be outfitted with a first type of tool in an upstream portion and with a second type of tool in a downstream portion, which second type of tool is absent in the upstream portion. These tools of the second type can be optimized with respect to their threshing effect in cooperation with the actuatable rethreshing device and possibly with the further rethreshing devices.

The tools of the second type should overlap with the actuatable rethreshing device in conveying direction.

Subject matter of the invention is also a combine harvester with a driver assistance system as described above.

BRIEF DESCRIPTION OF THE DRAWINGS

Further features and advantages of the invention will become apparent from the following description of embodiment examples referring to the accompanying figures. In the drawings.

DETAILED DESCRIPTION OF THE EMBODIMENTS

Figure 1:
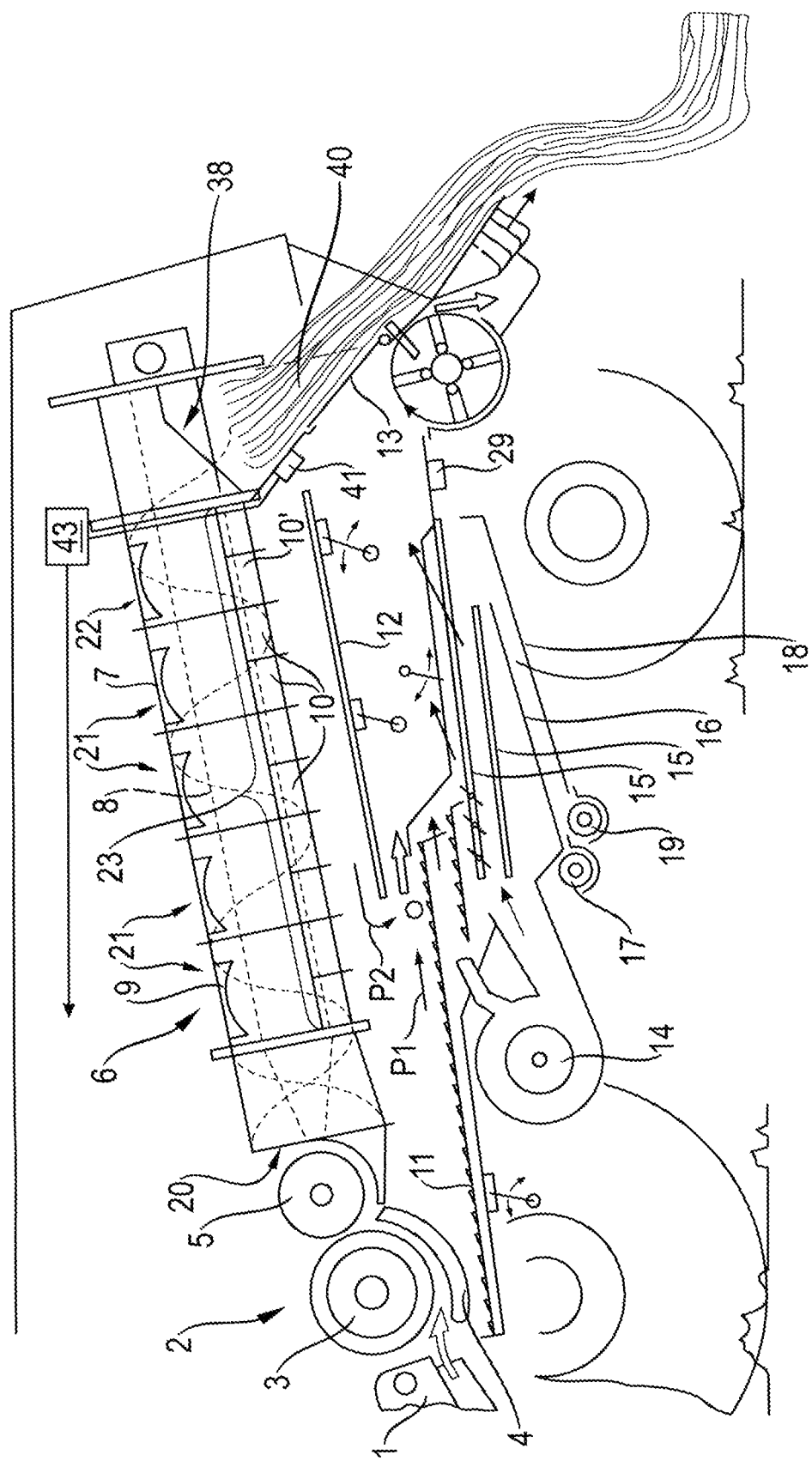
FIG. 1 shows a schematic section through the rear region of a combine harvester according to the present invention.

FIG. 1 shows a schematic section through the rear region of a combine harvester. In particular, this combine harvester can be the combine harvester described in EP 3 076 248 A1 as will be explained more precisely hereinafter. Therefore, the content of EP 3 076 248 A1 is hereby incorporated by reference in its entirety herein.

A crop flow of mown grain is reaped and gathered by a header, known per se, in the front region, not shown, of the combine harvester and is supplied to a tangential threshing device 2 by a conveyor device 1, only a portion of which is shown. The threshing device 2 is formed substantially from a threshing drum 3 with an axis which is oriented transverse to the driving direction of the combine harvester. The threshing drum 3 is outfitted at its outer lateral surface with friction elements and is surrounded over a portion of its circumference by a threshing concave 4. A portion of the grains which are separated from the stalks in the threshing device 2 falls through holes in the threshing concave 4 onto a conveyor floor 11 on which they are conveyed opposite the driving direction of the combine harvester as indicated by arrow P1 by means of shaking movements.

However, the majority of the crop is guided between the threshing drum 3 and the threshing concave 4 and is fed to a separating stage 6 with the aid of a beater 5.

The separating stage 6 comprises a cylindrical housing 7 with open ends and a separating rotor 8, outlined in dashed lines in FIG. 1, which extends within the housing 7 along the entire length thereof. One of the open ends of the housing 7 serves as input 20 via which the crop flow is fed into the separating stage 6.

The housing 7 comprises a plurality of tubular portions 21, 22 arranged in tandem in axial direction, each of which has closed walls in an upper circumferential area and a separating grate 10 in a lower circumferential area via which grains contained in the conveyed crop flow can exit the separating stage 6. Accordingly, the separating grates 10 form an output 23 extending in longitudinal direction of the housing 7 for a useful flow with abundant grains.

The useful flow arrives at a return pan 12. This return pan 12 is shaken so that material collected on it is conveyed in driving direction of the combine harvester in the direction indicated by arrow P2 and ultimately converges on the conveyor floor 11 with the grain that has already been separated in the threshing device 2.

The conveyor floor 11 conveys the useful flow to a cleaning stage. This cleaning stage is formed substantially from a fan 14 and a group of sieve pans 15 in the airflow of the fan 14 which are driven in an oscillating motion in a frame, not shown, and are charged with the useful flow. The grain contained in the useful flow trickles through the oscillating sieve pans 15 onto an inclined first guide pan 16. An auger conveyor 17 which conveys the grain to an elevator (not shown) and via the latter into a grain tank (not shown) is arranged at the lower end of the guide pan 16.

Light constituent parts of the useful flow are entrained by the airflow from the fan 14 during the screening and are ejected from the combine harvester. Finally, constituent parts of the useful flow which have traversed the entire length of the sieve pans 15 without falling through or being entrained by the airflow of the fan fall onto a second inclined guide pan 18 and are conveyed by an auger conveyor 19 arranged at the lower end thereof back to the threshing device 2 or to the separating stage 6 so as to pass again through the latter.

Figure 2:
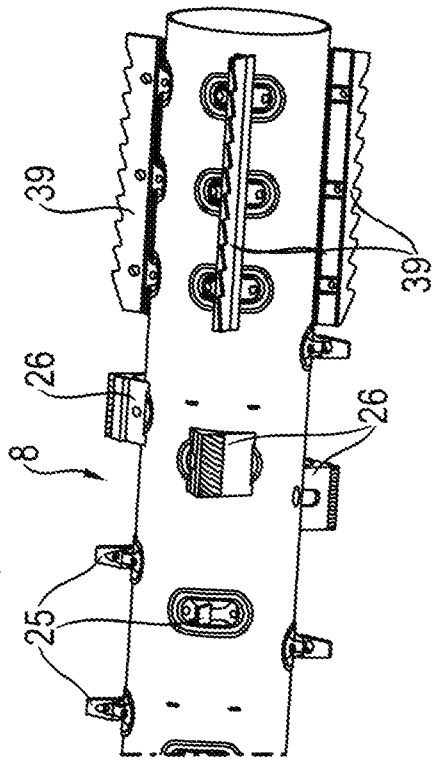
FIG. 2 shows the front end of a separating rotor used in the combine harvester.

As can be seen in FIG. 2, the separating rotor 8 has helical ribs 24 at its end facing the input 20. The rotation of the ribs 24 propels the crop entering the input 20 so as to move on a path running helically around the rotational axis of the separating rotor 8.

In a second region of the separating rotor 8, the ribs 24 are absent. Instead, the separating rotor 8 carries a plurality of pins 25 distributed along the circumference and along the rotational axis. Since these pins 25 can only induce a circumferential movement of the crop around the rotational axis, helical ribs 9 are provided at an inner side of the housing 7 to generate the required conveying action along the rotational axis and to knead the crop.

Figure 3:
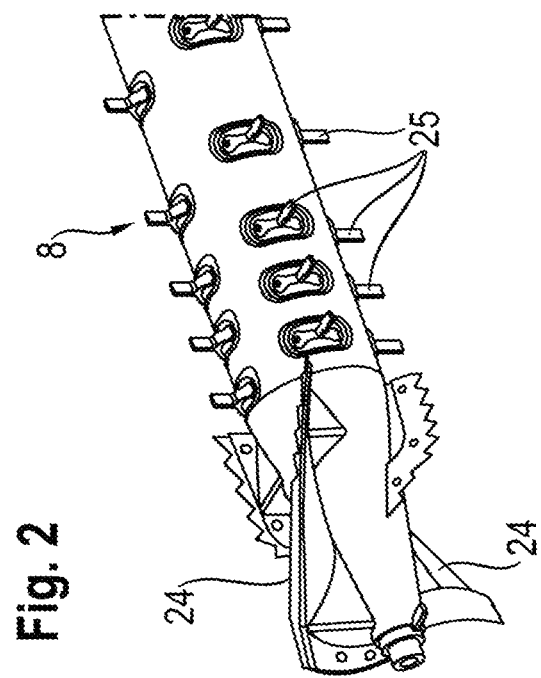
FIG. 3 shows the rear end of a separating rotor used in the combine harvester.

As is shown in FIG. 3, threshing bars 26 which are elongated along the axis follow the pins 25 in a third region of the separating rotor 8. This third region is enclosed by the last 22 of the tubular housing portions.

Figure 4:
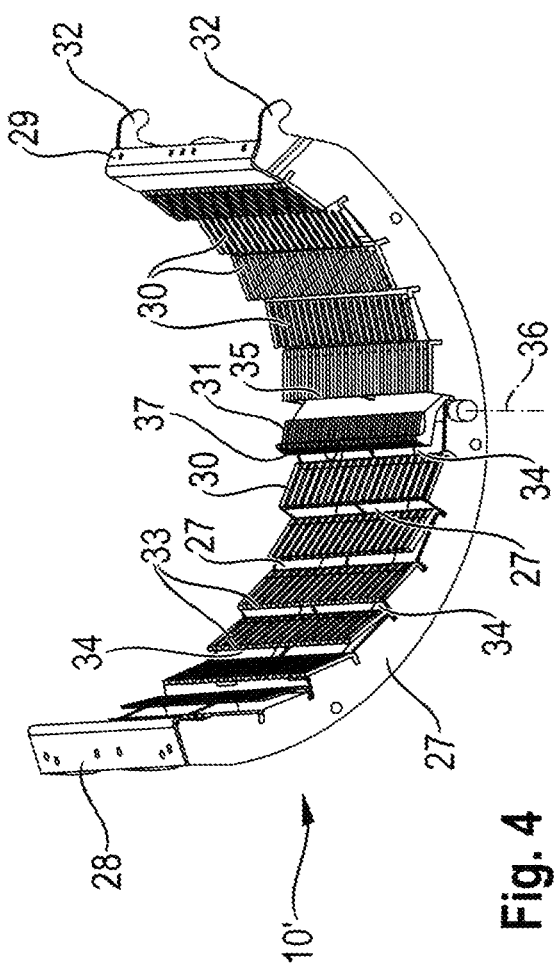
FIG. 4 shows a perspective view of a separating grate cooperating with the separating rotor with an actuatable rethreshing device.
Figure 6:
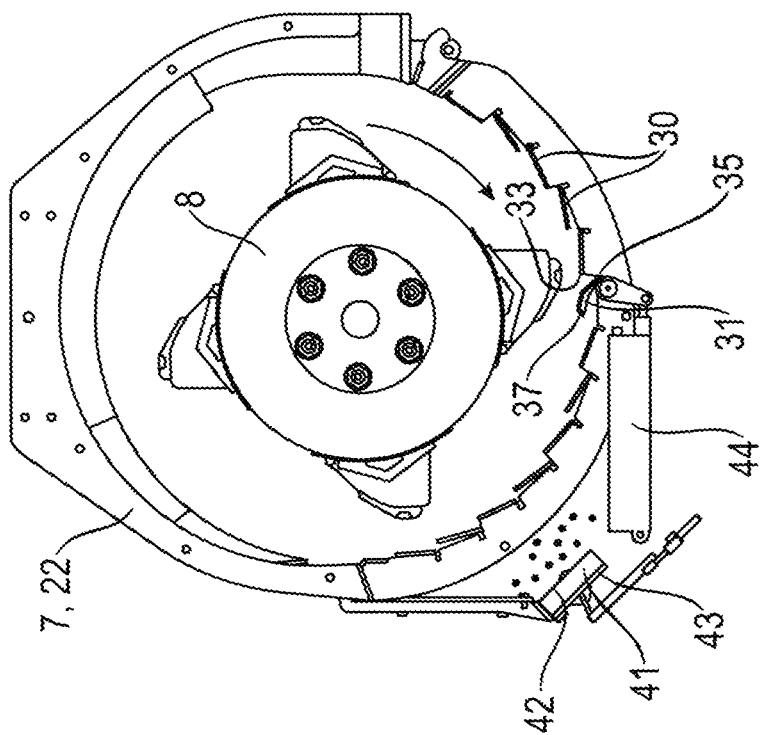
FIG. 6 shows a section analogous to FIG. 5 with the rethreshing device in actuated position.

FIG. 4 shows a perspective view of a threshing or separating grate 10' which forms a lower portion of this housing portion 22. The separating grate 10' has the approximate shape of a hollow cylindrical sector which extends at an angle of just 180° around the axis of the separating rotor 8. It comprises two or more support arcs 27 which are parallel to one another and concentric to the axis of the separating rotor 8. The support arcs 27 are connected to one another by end plates 28, 29 and a plurality of axially elongated segments 30, 31 distributed in circumferential direction along the support arcs 27. One of the end plates 28 is provided to be detachably fastened, e.g., by means of screws penetrating bore holes in the end plate 28, to an upper part, not shown, of the housing portion. The other end plate 29 is provided with hinge elements, in this case hooks 32, which cooperate with complementary hinge elements of the upper part in order to swivel the separating grate 10' and expose the separating rotor 8 when the end plate 28 is disconnected from the upper part.

The segments 30, 31 are formed in each instance as friction strips with a friction surface which faces the separating rotor 8 and extends in axial direction and in circumferential direction of the separating rotor.

A plurality of segments 30 is immovably mounted at the support arcs 27. Their friction surfaces are inclined in each instance opposite the circumferential direction such that the distance between a point on a threshing bar 26 and the point on a segment 30 opposite the latter in radial direction decreases in the course of rotation. Accordingly, the crop located between these points gradually compresses over the course of the movement in circumferential direction past the segment 30 and is accordingly subjected to an increasing shear load with a threshing effect until it can finally expand again after passing the rear edge 33 of segment 30. Grains which have subsequently been threshed out in this way can move through the crop again as a result of the expansion and exit the separating stage 6 via a gap 34 between segment 30 and a subsequent segment and arrive on the return pan 12. Therefore, the gaps 34 form a part of the output 23 extending along the separating stage 6.

At least one of the segments, designated by 31, is swivelable between an idle position and a working position around an axis 36 adjacent to its front edge 35. In the working position, the gap between a rear edge 37 of segment 31 and a threshing bar 26 moving past the latter is smaller compared to the rear edges 33 of segments 30. In the idle position, the gap is just as large, or larger, than the latter.

As is shown again in FIG. 1, a residual flow of crop with scarce grains reaches an output 38 of the separating stage after passing through the housing portion 22. An end of the separating rotor 8 projecting into this output 38 is provided with radially projecting ribs 39 (see FIG. 3) which spin the crop forward radially; the housing 7 surrounds the separating rotor 8 only toward the top so that the residual flow flows off into a downward sloping ejection passage 40. In this ejection passage 40, a grain sensor 41 is arranged at a deflecting surface 42 which deflects the residual flow. An evaluating circuit 43 is connected to the grain sensor 41 in order to filter out a spectral component attributable to threshed out individual grains from the noise recorded by the grain sensor 41 and to estimate the amount of individual grains in the residual flow based on the intensity of this spectral component.

Figure 5:
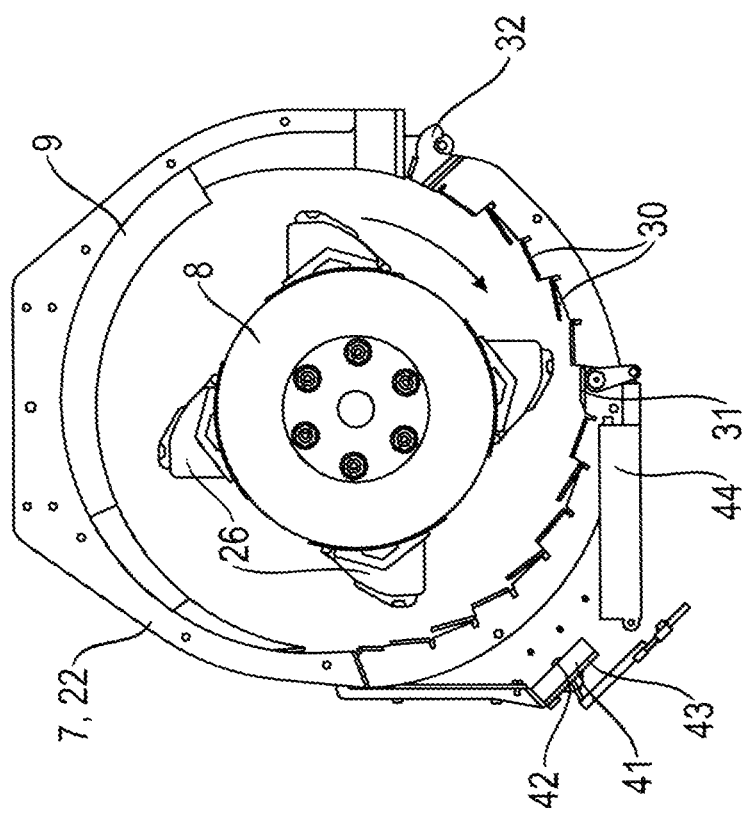
FIG. 5 shows an axial section through the separating rotor and the separating grate with the actuatable rethreshing device in an idle position.

The evaluating circuit 43 further controls a hydraulic or pneumatic actuating cylinder 44 (shown in FIGS. 4 and 5) for adjusting segment 31.

The evaluation of the signal of the grain sensor 41 by the evaluating circuit 43 is carried out separately depending on the position of segment 31. Differences in the signal depending on the position of segment 31 are to be attributed to grains which were threshed out in the working position of segment 31 but which would have passed through the separating stage 6 in the idle position without being threshed. Therefore, the magnitude of this difference is a measure for the threshing loss that can be used in the course of the harvesting process to optimize operating parameters of the threshing device 2, separating stage 6 or cleaning stage.

In order for such an optimization to be carried out, the threshing losses estimated by the evaluating circuit 43 and the grain component in the residual flow determined in the idle position of segment 31 can be displayed to the driver of the combine harvester on a display instrument connected to the evaluating circuit 43, and it is left up to the driver to optimize the operating parameters based on the displayed values. In order to allow an optimization that does not depend on the skill and attentiveness of the driver, the evaluating unit 43 is further programmed to support an assistance system operating mode in which it optimizes the operating parameters based on the determined values of grain proportion and threshing losses.

The operation of segment 31 in the working position causes an increased energy consumption and an increased occurrence of non-grain materials and grain breakage reaching the useful flow. Since the time spent by segment 31 in the working position is only a small fraction of the total operating time of the combine harvester, these changes have no noticeable effect on the total energy consumption or on the purity of the grain which ultimately arrives in the grain tank. Especially because the working position is occupied only intermittently, a very small gap width between the segment and threshing bars can be selected for this working position, which achieves very low threshing losses but would possibly lead to a backup of crop in the separating stage 6 during continuous operation.

A portion of the grain that is additionally threshed out in the working position of segment 31 exits the separating stage 6 via the gaps 34 between the segments and is therefore not detected by the grain sensor 41. In order to improve the sensitivity with which the threshing losses can be estimated, it can therefore be provided that the gaps 34 are closed. A closing of this kind is preferably carried out intermittently, i.e., the gaps 34 are mostly open during harvesting operation in order to feed at least a portion of the grain threshed out by segments 30 to the return pan 12 but can be closed by the evaluating circuit 43 in order to measure the grain component of the residual flow in the ejection passage 40 in the idle position and in the working position of segment 31 and estimate the threshing losses from this.

The evaluating circuit 43 can be implemented by the same circuit components as the driver assistance system known from the already-cited EP 3 076 248 A1. Since the computing device described therein is already connected to the actuating elements required for adjusting the threshing unit and to diverse sensors for detecting relevant operating parameters for optimizing the threshing process, it is sufficient for implementing the invention described herein to add the above-described residual grain sensor and the actuatable rethreshing device, and a corresponding expansion of the operating program of the computing device is carried out.

REFERENCE NUMERALS

1 conveyor device
2 threshing device
3 threshing drum
4 threshing concave
5 beater
6 separating stage
7 housing
8 conveying member
9 rib
10 separating grate
11 conveying floor
12 return pan
13 chute
14 fan
15 sieve pan
16 first guide pan
17 auger conveyor
18 second guide pan
19 auger conveyor
20 input
21 tubular portion
22 tubular portion
23 output
24 rib
25 pin
26 threshing bar
27 support arc
28 end plate
29 end plate
30 segment
31 segment
32 hook
33 rear edge
34 gap
35 front edge
36 axis
37 rear edge
38 output
39 rib
40 ejection passage
41 grain sensor
42 deflecting surface
43 evaluating circuit
44 actuating cylinder

What is claimed is:

1. A driver assistance system for a combine harvester that has a processing stage with an input for a crop flow, a first output for a useful flow which is obtained from the crop flow and has abundant threshed grains, and a second output for a residual flow with scarce grains, wherein at least one operating parameter of the processing stage is adjustable, wherein the driver assistance system comprises:
    an actuatable rethreshing device configured to be arranged at the second output of the processing stage, wherein the rethreshing device comprises a separating rotor, and a separating grate having a plurality of fixed segments and at least one movable segment, the at least one movable segment being equipped with friction strips and arranged opposite to a threshing bar situated at the separating rotor, wherein the at least one movable segment is movable between an active position configured for threshing grain, and an inactive position,
    a residual grain sensor configured for detecting a proportion of threshed out grain in the residual flow downstream of the rethreshing device, and
    an evaluating device which is adapted to turn the rethreshing device on and off by moving the at least one movable segment between the active position and the inactive position, to compare the proportions of threshed out grains in the residual flow when the rethreshing device is turned on and when the rethreshing device is turned off, and to adapt the at least one operating parameter of the processing stage based on the comparison.

2. The driver assistance system according to claim 1, wherein the evaluating device is adapted to change the at least one operating parameter when the difference in proportions of threshed grains in the residual flow when the actuatable rethreshing device is turned on compared to when the actuatable rethreshing device is turned off exceeds a threshold.

3. The driver assistance system according to claim 1, wherein the at least one movable segment is radially adjustable.

4. The driver assistance system according to claim 3, wherein the radially adjustable segment is adjustable by swiveling around an axis.

5. The driver assistance system according to claim 4, wherein the axis extends adjacent to an edge of the adjustable segment.

6. The driver assistance system according to claim 4, wherein the adjustable segment extends in a circumferential direction of the separating rotor over a portion of a circumference thereof, and wherein the axis extends adjacent to a front edge of the adjustable segment in relation to a rotating direction of the separating rotor.

7. The driver assistance system according to claim 1, wherein the processing stage comprises a threshing stage and a separating stage, and wherein the at least one operating parameter is an operating parameter of the threshing stage or of the separating stage.

8. The driver assistance system according to claim 7, wherein an input of the separating stage and the second output are located at opposite ends of the separating stage.

9. The driver assistance system according to claim 8, wherein, with reference to a conveying direction of the crop from the input of the separating stage to the second output, the separating stage has an upstream portion in which the first output is located and a downstream portion in which the rethreshing device is located.

10. The driver assistance system according to claim 8, wherein the first output is elongated with reference to a conveying direction of the crop from the input of the separating stage to the second output, and wherein a portion of the separating stage in which the actuatable rethreshing device is located overlaps in the conveying direction with a downstream end of the first output.

11. The driver assistance system according to claim 6, wherein the separating rotor is outfitted with a first type of tool in an upstream portion with reference to the conveying direction and with a second type of tool in a downstream portion with reference to the conveying direction, wherein the second type of tool is absent in the upstream portion.

12. The driver assistance system according to claim 11, wherein the tools of the second type overlap with the actuatable rethreshing device in the conveying direction.

13. A combine harvester having the driver assistance system according to claim 1.

14. The driver assistance system according to claim 1, wherein in the active position of the at least movable segment, a gap between a rear edge of the at least one movable segment and the threshing bar is smaller than a gap between a rear edge of the fixed segments and the threshing bar, as the threshing bar moves past the fixed and movable segments.

* * * * *